(12) United States Patent
He et al.

(10) Patent No.: US 8,307,005 B1
(45) Date of Patent: Nov. 6, 2012

(54) DETERMINING REACHABILITY

(75) Inventors: Hao He, Sunnyvale, CA (US); Yu He, Sunnyvale, CA (US); David P. Stoutamire, Redwood City, CA (US)

(73) Assignee: Google Inc., Mountain View, CA (US)

( * ) Notice: Subject to any disclaimer, the term of this patent is extended or adjusted under 35 U.S.C. 154(b) by 184 days.

(21) Appl. No.: 12/827,676

(22) Filed: Jun. 30, 2010

(51) Int. Cl.
*G06F 17/00* (2006.01)

(52) U.S. Cl. ......... 707/791; 707/802; 707/822; 707/828

(58) Field of Classification Search ........... 707/600–899
See application file for complete search history.

(56) References Cited

U.S. PATENT DOCUMENTS

2009/0006371 A1* 1/2009 Denoue et al. .................... 707/5

* cited by examiner

*Primary Examiner* — Isaac M Wood
(74) *Attorney, Agent, or Firm* — Fish & Richardson P.C.

(57) ABSTRACT

Methods, systems, and apparatus, including computer programs encoded on a computer storage medium, for determining a resource's reachability score. In one aspect, a method includes identifying one or more secondary resources reachable through one or more links of a primary resource wherein the secondary resources are within a number of hops from the primary resource; determining an aggregate score for the primary resource based on respective scores of the secondary resources wherein each one of the respective scores is calculated based on prior user interactions with a respective secondary resource; and providing the aggregate score as an input signal to a resource ranking process for the primary resource when the primary resource is represented as a search result responsive to a query.

18 Claims, 8 Drawing Sheets ical examples related to video searches and video search
DETERMINING REACHABILITY

BACKGROUND

This specification relates to determining a resource's reachability score.

The Internet provides access to a wide variety of resources, including web pages, images, text documents, and multimedia content. Search engines identify resources in response to a query including one or more search terms or phrases by returning search results that link to the identified resources. The search results are typically ordered for viewing according to scores assigned to the search results by a scoring function. The scoring function ranks the search results according to various signals including, for example, the relevance of the resources to the query and measures of quality of the resources.

SUMMARY

In general, one innovative aspect of the subject matter described in this specification can be embodied in methods that include the actions of identifying one or more secondary resources reachable through one or more links of a primary resource wherein the secondary resources are within a number of hops from the primary resource, determining an aggregate score for the primary resource based on respective scores of the secondary resources wherein each one of the respective scores is calculated based on prior user interactions with a respective secondary resource, and providing the aggregate score as an input signal to a resource ranking process for the primary resource when the primary resource is represented as a search result responsive to a query. Other embodiments of this aspect include corresponding systems, apparatus, and computer programs, configured to perform the actions of the methods, encoded on computer storage devices.

These and other embodiments can each optionally include one or more of the following features. The prior user interactions with the respective secondary resource can represent an aggregation of multiple users' interactions with the secondary resource. The prior user interactions with the respective secondary resource can include a median access time or a click-through-rate associated with the respective secondary resource. The respective secondary resource can include a document, an image, or multimedia content, and the primary resource can be a web page providing access to the document, image, or multimedia content. The one or more secondary resources can be reachable through one or more links of the primary resource comprise respective tertiary resources reachable through one or more links of a corresponding secondary resource. The respective scores of the secondary resources can be calculated based on signals derived from prior user interactions with the respective tertiary resources. Providing the aggregate score as an input signal can include determining an initial rank score for the primary resource, determining a promotion factor based on the aggregate score, and then modifying the aggregate score by combining the initial rank score with the promotion factor.

Particular implementations of the subject matter described in this specification can be implemented to realize one or more of the following advantages. A resource's reachability score may provide an indication of the amount of time a querying user is likely to spend accessing the resource and any additional resources linked to the resource. Such a score may be used in a scoring function to produce search results that improve user experience and potentially improve an advertiser's ability to reach the user.

The details of one or more implementations of the subject matter described in this specification are set forth in the accompanying drawings and the description below. Other features, aspects, and advantages of the subject matter will become apparent from the description, the drawings, and the claims.

DESCRIPTION OF THE DRAWINGS

Like reference numbers and designations in the various drawings indicate like elements.

DETAILED DESCRIPTION

In the description below, for the purposes of explanation, specific examples related to video searches and video search results have been set forth in order to provide a thorough understanding of the implementations of the subject matter described in this specification. It is appreciated that the implementations described herein can be utilized in other capacities as well and need not be limited to determining scores related to graphic, video, or image resources. For example, implementations may be used to determine scores related to other resources, including, for example, HTML pages, word processing documents, and portable document format (PDF) documents, images, feed sources, etc. Accordingly, other implementations are within the scope of the claims.

Figure 1:
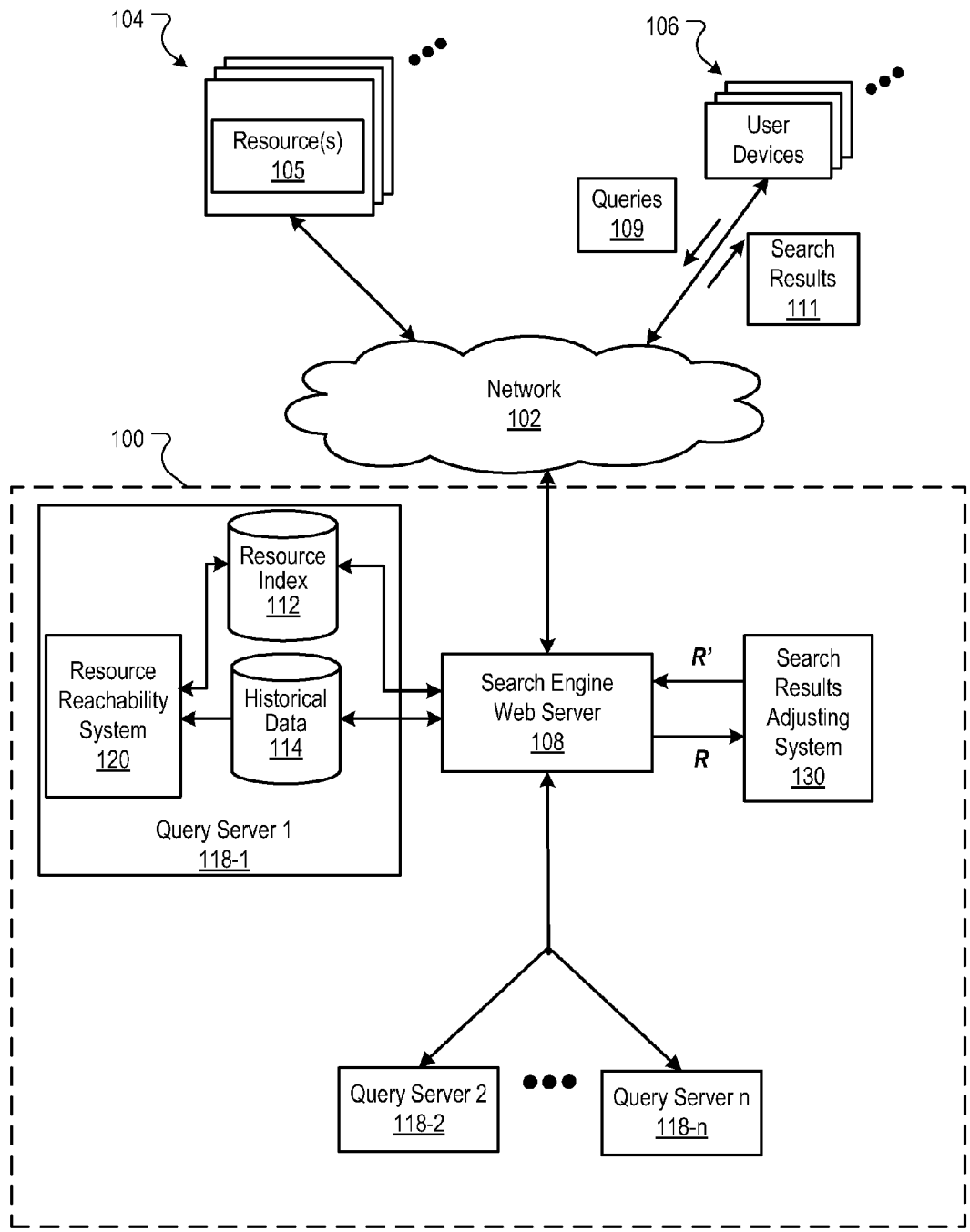
FIG. 1 is a block diagram of an exemplar search system that generates and utilizes reachability scores for search queries.

FIG. 1 is a block diagram of an exemplar search system 100 that generates and utilizes reachability scores for search queries. A network 102, e.g., the Internet, connects websites 104, user devices 106, and the search system 100.

A website 104 is one or more resources 105 associated with a domain name and hosted by one or more servers. An example website is a collection of web pages formatted in hypertext markup language (HTML) that can contain text, images, multimedia content, and programming elements, e.g., scripts. Each website 104 is maintained by a publisher, e.g., an entity that manages and/or owns the website.

A resource 105 is any data that can be provided by a website 104 or by a process such as an executing software program, for example, over the network 102 and that is associated with a resource address. A resource can be provided in one or more pieces (e.g., file fragments) or as a stream. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks or "links") and/or embedded instructions (e.g., JavaScript scripts).

A user device 106 is an electronic device capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 100 identifies the resources 105 by crawling and indexing the resources 105 provided by websites 104 or other processes. The indexed and, optionally, cached copies of the resources 105 are stored in a resource index 112 or in other storage. In addition, the resource index 112 or other storage can associate one or more scores with the indexed resources based on intrinsic features of the resources and prior user interactions with the resource.

The one or more scores include, for example, a reachability score (RS) computed by the resource reachability system 120. Generally speaking, an RS is a score representing a number of resources a user is likely to visit by traversing links from the initial resource and/or an amount of time a user is likely to spend accessing a resource that is responsive to a query, including other resources linked (e.g., by hyperlinks or other associations) to the resource. The other resources are referred to as secondary or children resources. Secondary resources include grandchildren or tertiary resources, relative to the initial resource, great-grandchildren resources, etc. In general, each of the resources accessible by traversing links from the initial resource is referred to herein as a secondary resource unless otherwise specified.

Figure 2A:
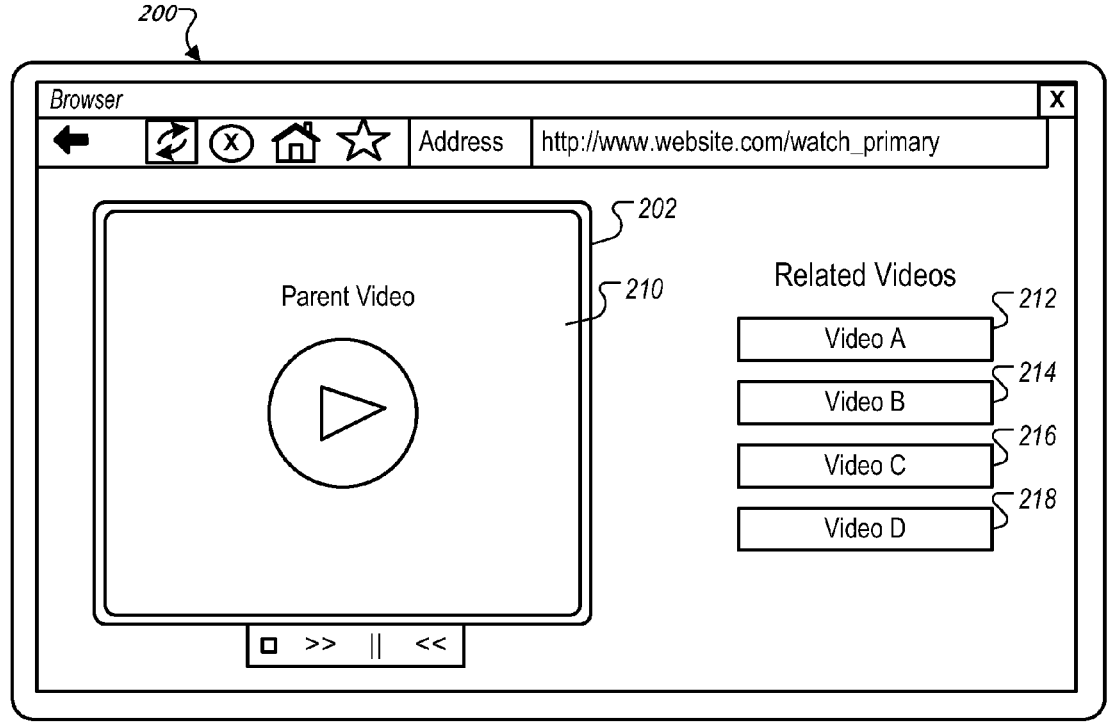
FIGS. 2A and 2B illustrate an exemplar video watch-page including a display window for a video being viewed and links to secondary resources.
Figure 2B:
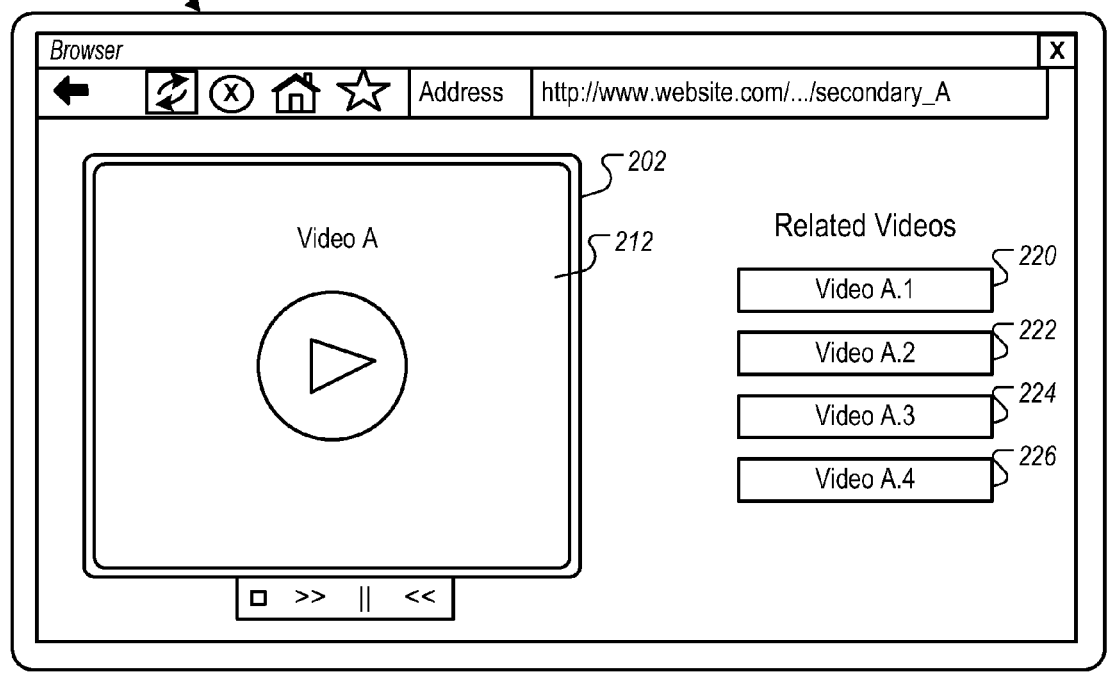

FIGS. 2A and 2B illustrate an exemplar video watch-page 200 including a display window 202 for viewing a video. In FIG. 2A, watch-page 200 presents a video 210 in display window 202 and links to related secondary resources 212-218. In FIG. 2B, watch-page 200 presents a video 212 in display window 202 and links to secondary resources 220-226. Each of the secondary resources may similarly have respective secondary resource links accessible when the corresponding secondary resource is being viewed.

Figure 2C:
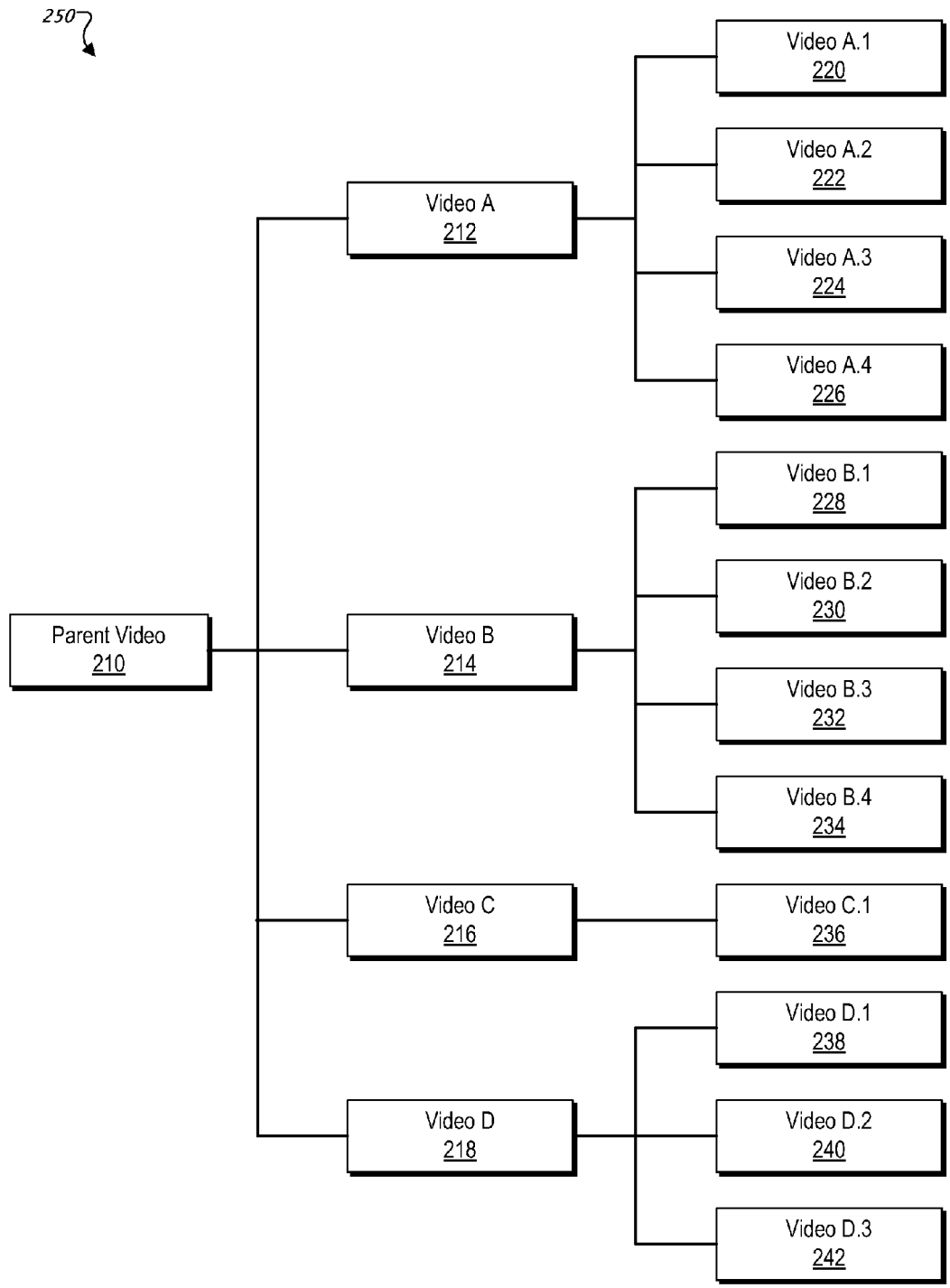
FIG. 2C illustrates a link graph associated with the exemplar video watch-page of FIG. 2A.

In some implementations, the RS is based on a variety of resource data and user interaction data. Resource data are derived from features intrinsic to the resource, e.g., the number of resources reachable within a number of "hops" from the resource. In some implementations, the number of "hops" associated with a resource is equal to the fewest number of user actions (e.g., a mouse click, a finger gesture on a touch-sensitive surface, a speech command to a microphone, or by way of another input device) required to reach the target resource via the primary resource. In further implementations, the number of "hops" is the number of links that need to be traversed to reach a resource. For example, FIG. 2C illustrates a link graph 250 for watch-page 200 including two levels. Each level contributes to a hop count representing the total hops required to reach the secondary resource from the initial resource. For example, two hops are required to access any of secondary resources 220-242 from the watch page 200 for parent video 210. Correspondingly, one hop is required to access any of secondary resources 212-218. In this example, four secondary resources are accessible within one hop from the parent resource 210 and 16 secondary resources are accessible within two hops from the parent resource (212-242).

User interaction data are derived from user interactions related to the resource and resources accessible through the resource, e.g., click through rates, user ratings, median access time, etc. In some implementations, a resource's click-through-rate for a given period of time is derived from the number of times users have been provided with an opportunity to access the resource and the number of times users have actually accessed the resource. A simplified example for calculating the click-through-rate of a resource presented P times and accessed A times (aggregated over multiple user sessions) is expressed as the ratio of A/P. Other ways to calculate click through rates are possible. A resource's user rating indicates the average rating (e.g., three out of five stars) of all user ratings of the resource, for instance. By way of illustration, a video rating system can have rating values of one, two, three, four or five stars, with one star indicating strong dislike and five stars indicating strong enjoyment on the part of the user rating the video. Other rating systems are possible, however. A resource's median access time is based multiple users' interactions with the resource. As used herein, the term "access" means that the resource is played back or viewed on a user device without interruption, e.g., without navigating to another web page, or causing the browser window in which the resource is being accessed to become an inactive window. Other definitions of "access" are possible. Scores can be generated based on one or more of these data and can be combined to calculate the RS for the corresponding resource.

Referring again to FIG. 1, the resource reachability system 120 periodically or non-periodically calculates an RS for each resource. The RS's can be indexed and stored. Each query processing leaf node server 118 (e.g., 118-1) can store a subset of the resource index 112 that indexes data relating to the resources and its corresponding portion of the data. For example, assuming there are 10,000,000 resources that are indexed, and assuming there are 256 leaf node servers, each leaf node server indexes about 39,000 resources. These values are exemplary, and other apportionments can also be used.

In some implementations, the search system 100 has a hierarchical architecture, in which a web server 108 within the system 100 acts as a root node and distributes the queries 109 to one or more query processing leaf node servers 118. The index of the resource index 112 is apportioned among the multiple leave node servers 118-1 . . . 118-n, and a given server 118 processes a portion of the index during query processing. The query leaf node server processing is described in more detail below.

The user devices 106 submit search queries 109 to the search system 100. In response, the search system 100 accesses the resource index 112 (i.e., provides the queries to the leaf node servers 118) to identify resources 105 that are responsive to the search queries 109. The search system 100 identifies the resources 105, generates search results 111 that identify the resources 105, and returns the search results 111 to the user devices 106. A search result is data generated by the search system 100 that identifies a resource 105 that is responsive to a particular search query, and can include a link to the resource 105 or the resource 105 itself. An example search result 111 can include a web page title, a snippet of text, a portion of an image extracted from the web page, or a frame of a video, and the uniform resource locator (URL) of the web page. Other search results are possible.

Search queries 109 submitted during user query sessions are stored in a data store such as the historical data store 114. Selection data specifying actions taken in response to search results provided are also stored in a data store such as the historical data store 114. These actions can include whether a search result was selected, and subsequent actions taken by the user. User actions indicating selection of a search result 111 include a mouse click, a finger gesture on a touch-sensitive surface, a speech command to a microphone, or by way of another input device, for example, in order to play the video or audio resources identified by the search result, listen to speech synthesized text in the resource identified by the search result, view text or multimedia content identified by the search result, etc. Subsequent actions include, for example, navigating away from the resource, accessing the resource until completely presented, etc. The data stored in the historical data store 114 can be used to map search queries 109 submitted during search sessions to resources 105 that were identified in search results 111 and the actions taken by users.

In general, search results 111 are scored and ranked by a process executing on the web server 108 or other server. Various search scoring algorithms can be used to generate information retrieval (IR) scores and other scores for resources. In some implementations a resource's score can be based the resource's IR score, quality score, RS, or combinations of these. In some implementations, a quality score is a measure of a quality of a video resource based on video feature data. Video feature data are derived from features intrinsic to the video, e.g., video feature values related to edge detection, shot change density, audio volume, audio spectrogram, color histogram, object detection (e.g., face detection, logo detection), etc.

Figure 3A:
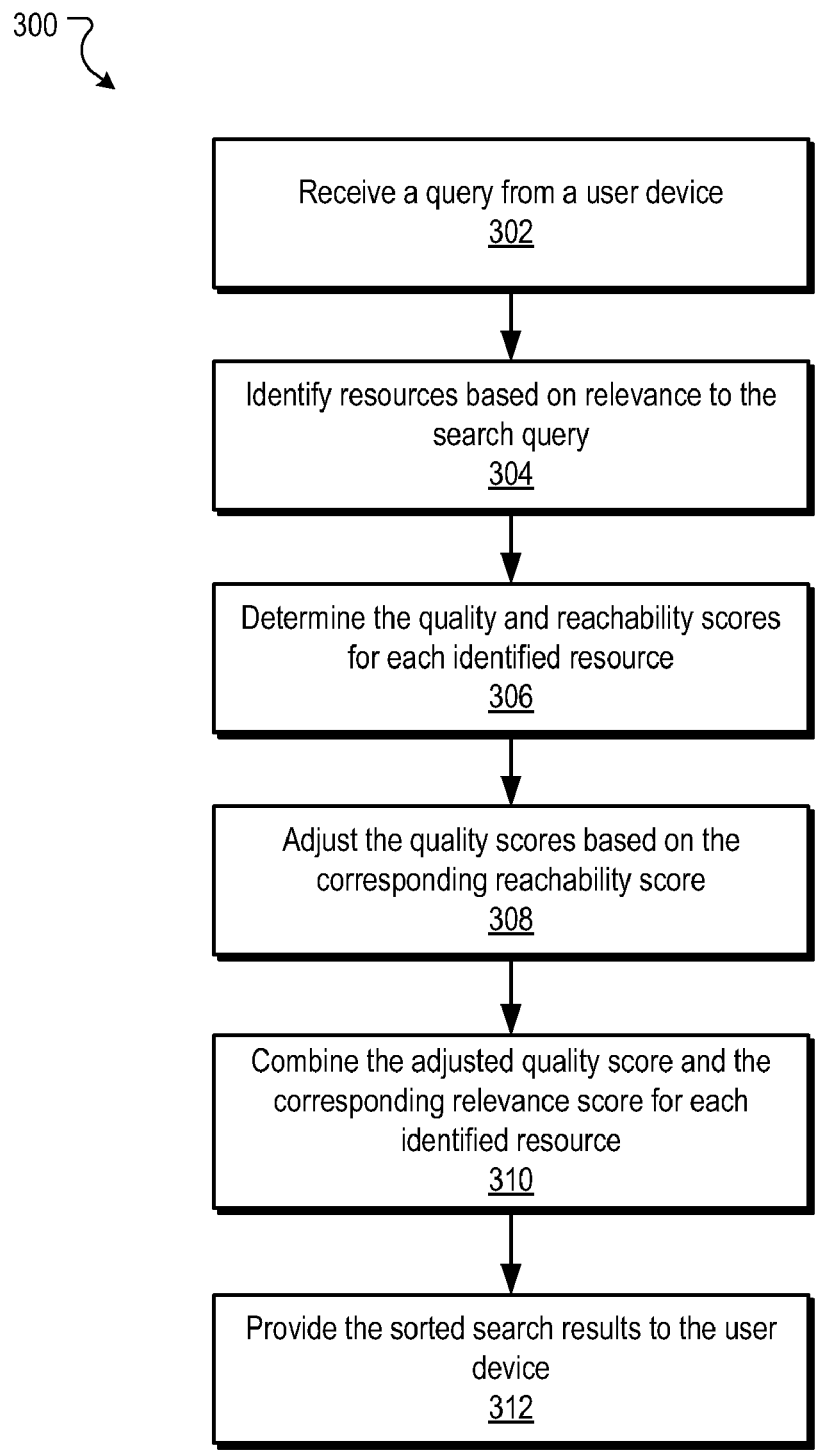
FIG. 3A is a flow diagram of an exemplar search operation utilizing reachability scores to determine quality scores.
Figure 3B:
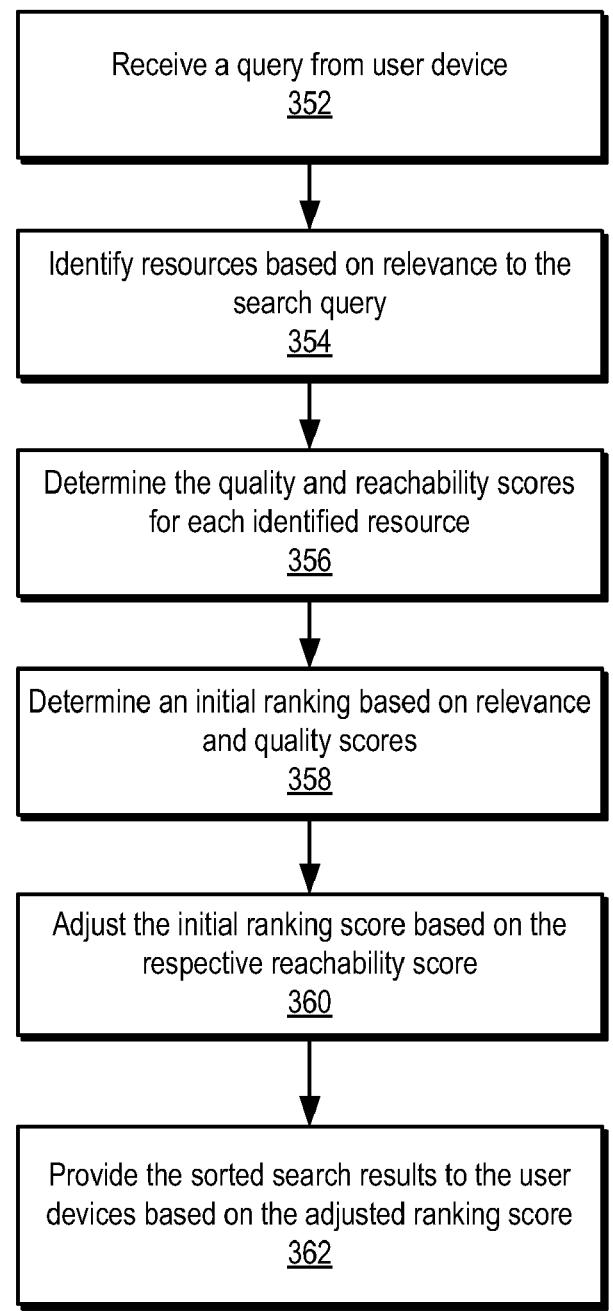
FIG. 3B is a flow diagram of an exemplar search operation utilizing reachability scores to adjust an initial ranking.

The search system 100 generates search results 111 referencing the resources 105 and ranks the search results according to their scores. The search results are then provided in response to the query ordered by their scores. In some implementations, RS's are used to adjust resource quality scores of one or more of the search results 111. In other implementations, the RS's are used to adjust an overall score of one or more of the search results 111. FIGS. 3A and 3B are flow diagrams of an example processes 300, 350 of resource search operations that utilize reachability scores in accordance with these implementations.

As illustrated in FIG. 3A, a query is received from a user device (e.g., user device 106; step 302). Resources 105 are identified based on relevance to a search query (e.g., by a leaf node 118; step 304). Then, for each identified resource 105, the quality scores and the RS's are determined (306), for example, based on data stored in the resource index 112 or in other storage. Next, the quality score is adjusted based on the RS (308) and combined with the relevance score (310). For example, in some implementations, the quality score of a resource 105 is multiplied by a factor determined from a linear function based on the RS of the resource. The factor has a minimum value (e.g., 1) and a maximum value (P). If the RS is less than a minimum threshold (T1), the quality score is multiplied by the minimum value (i.e., QS×factor=QS×1). If the RS is greater than a maximum threshold (T2), the quality score is multiplied by the maximum value (i.e., QS×factor=QS×P). Otherwise, the quality score is multiplied by a value between the minimum and maximum value (e.g., QS×factor=QS×P(RS−T1)/(T2−T1)). Other functions are also possible, including, for example, step-wise, logarithmic, quadratic, exponential, random, etc. Further, additional threshold limits may be used to customize the function. Once the quality score has been adjusted, the combined scores are optionally sorted in descending order and the search results 111 are returned to the user (e.g., via user devices 106; step 312).

Figure 4:
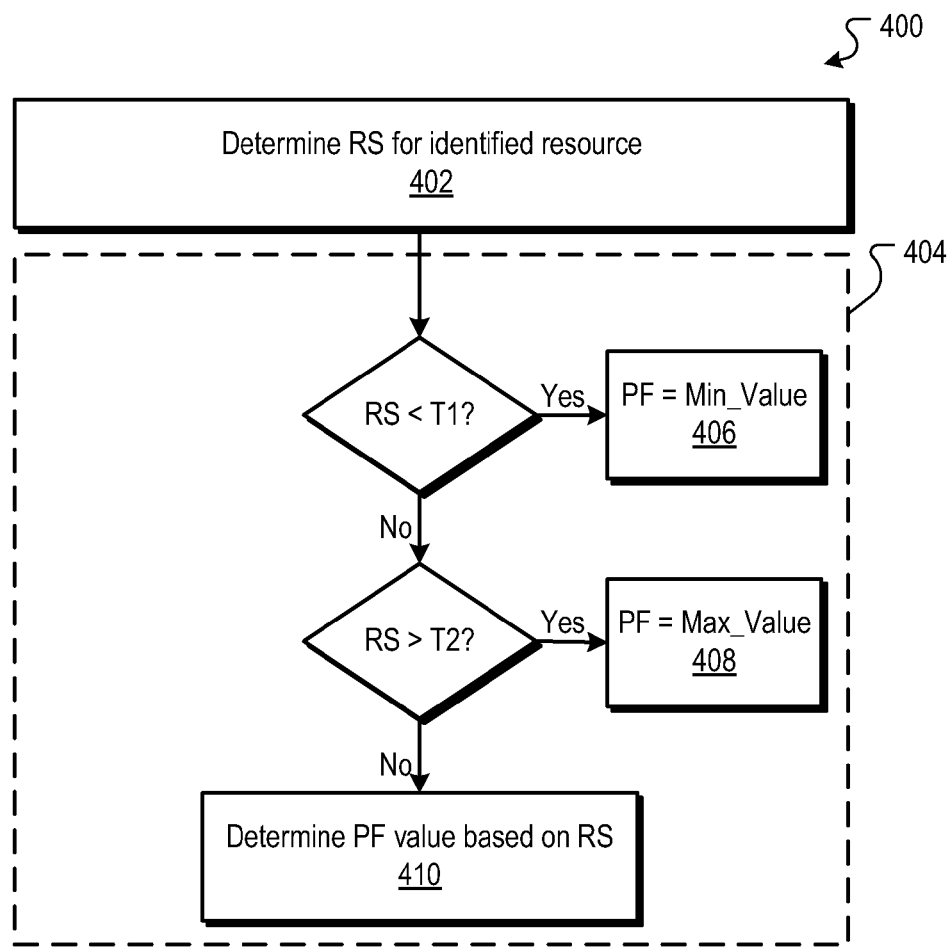
FIG. 4 illustrates an exemplar algorithm for assigning a promotion factor value based on the reachability score.

Alternatively, as illustrated in FIG. 3B, an initial ranking (R) is determined (e.g., by the server system 100) based on a combination of the relevance and quality scores (358), and adjusts the overall ranking (R') of each resource by the corresponding RS (360). For example, in some implementations, the search results are provided to a search results adjusting system 130 at the search system 100. The search results adjusting system 130 adjusts the scores of each scored resources by the reachability score of the resource to which the score corresponds, and then ranks the search results in descending order of the adjusted scores. For example, in some implementations, the cumulative score for each search result is multiplied by the reachability score of the resource to which the score corresponds. Other adjustment functions can also be used. For example, in some implementations, the reachability score may be used to determine a promotion factor (PF) which is combined with the initial ranking to generate the adjusted ranking A promotion factor of 1, for example, results in no change to the ranking value while a promotion factor greater than 1 results in an increase in the ranking value (i.e., a promotion). FIG. 4 illustrates an exemplar algorithm for assigning a promotion factor value based on the reachability score.

As illustrated, once RS is determined (402), a PF value is set for the resource based on the value of the corresponding RS (404). If the RS is less than a minimum threshold (T1), the PF is set to a minimum value (e.g., 1) (406). If the RS is greater than a maximum threshold (T2), the PF is set to a maximum value (e.g., 1.5) (408). If the RS is between T1 and T2, inclusive, the PF may be set to a value between the minimum and the maximum value according to a predetermined function (e.g., step-wise, linear, logarithmic, quadratic, exponential, random, etc.) (410).

Figure 5:
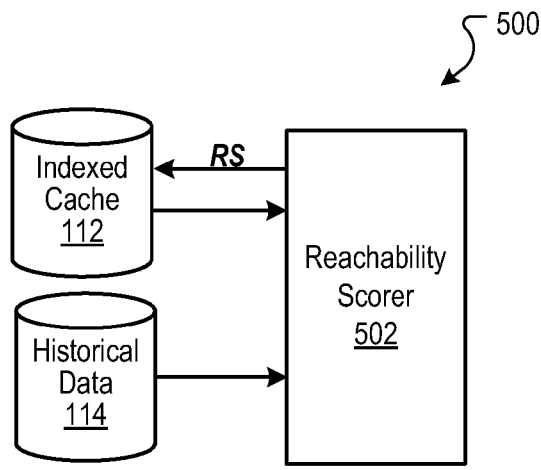
FIG. 5 is a block diagram of a system for generating reachability scores.

Referring now to FIG. 5, a block diagram of a system 500 for generating an RS is implemented in a search results adjusting system 130. The system 500 includes a reachability scorer 502 having access to the resource index 112 or other storage and the historical data 114. In operation, the scorer 502 analyzes the data stored in the resource index 112 or other storage and the historical data 114 and determines values for multiple reachability metrics for scoring a resource. In some implementations, the RS is a function of user interaction data and intrinsic resource data. For example, for three hops from the primary resource (k=3), an exemplar function RS can be calculated according to the equation (1) below:

$$RS = \Sigma S_i + \Sigma(W_i * RS_i) \quad (1)$$

Where:
RS=reachability score for a primary resource;
$RS_i$=reachability score for a secondary resource with respect to a current level, and is equal to a constant at level k;
$S_i$=a signal value derived from an $i^{th}$ secondary resource accessible from the current level; and
$W_i$=a weighting value associated with the $i^{th}$ secondary resource accessible from the current level.

In some implementations, the signal value $S_i$ at the current level is derived from the existence of a secondary resource accessible from the current level. For example, the sum of $S_i$ at the current level is equal to the number of secondary resources accessible from that level (e.g., via a corresponding link, script, applet, etc.). By way of illustration, there are four secondary resources (214, 216, 218, and 220) accessible in watch page 200 of FIG. 2A. In some implementations, W, is normalized such that it has a maximum value of one. For example, W, in some implementations is equal to the click-through-rate ($CTR_i$) for the $i^{th}$ secondary resource at the current level divided by the click-through-rate for the parent resource at the current level (e.g., the primary resource when the current level is 1). Further in some implementations, $RS_i$ is equal to one or zero when the current level is equal to the maximum number of hops (e.g., k=3).

Other scores and weighting values may be used including, for example, the resource quality score, an access or click count, an average user rating, a median access time (e.g., time spent viewing the resource), a video duration, and an importance graph ranking. Furthermore, in some implementations, each signal value is normalized to reduce bias that can occur when summing two different signal values derived from scores that may have values that differ by orders of magnitude, e.g., a view count value and a click-through-rate.

In some implementations, W, is adjusted based on the number of data points available. For example, a CTR value may be unreliable if the resource has only been accessed twice and very reliable if it has been accessed 1,000 times. Therefore, W, may be increased for a resource having fewer data points, thus increasing access opportunities and, potentially, the number of data points, and/or the weight $W_j$ may be decreased for a resource having a high number of data points.

The number of hops (k), or sub-levels, allowed to contribute to the RS may be statically assigned (e.g., by a system administrator) or dynamically assigned. For example, the number of hops may be dynamically set to the average number of videos watched per user in a given period of time (e.g., 24 hours) or the average number of videos watched per user per session. Other signals may be used to derive a value for k. Once the number of hops has been determined, the resource reachability system 120 calculates, indexes, and stores the RS for each resource for use in ranking search results 111 in response to a query, as described above.

The ranked search results 111 are ordered according to this ranking and provided to the user device 106. The user devices 106 receive the search results 111, e.g., in the form of one or more web pages, and render the search results for presentation to users. In response to the user selecting a link in a search result at a user device 106, the user device 106 requests the resource 105 identified by the link. The website 104 hosting the resource 105 receives the request for the resource from the user device 106 and provides the resource 105 to the requesting user device 106.

In some implementations, the resource reachability system 120 is tuned to exclude certain secondary resources in calculating reachability scores for each primary resource. For example, a trustworthiness score T indicates whether the resource is reliable (i.e., includes relevant information) based on prior user interactions and optionally, a quality measure of the resource, based on intrinsic features. User interactions indicating trustworthiness include, for example, long clicks, source of resource, etc.

A "long click" occurs if a resource is accessed for a period of time that exceeds a threshold access time. For example, each selection of a presented resource (e.g., a document) is recorded as a "click" for the resource in connection with the query. As described above, user actions indicating selection of a search result 111 include a mouse click, a finger gesture on a touch-sensitive surface, a speech command to a microphone, or by way of another input device, for example, in order to play the video or audio resources identified by the search result, listen to speech synthesized text in the resource identified by the search result, view text or multimedia content identified by the search result, etc. A timer tracks how long a user accesses, views, or "dwells" on the resource. For example, a longer time spent dwelling on a resource (i.e., a long click) can indicate that a user found the resource to be relevant for the query. A brief period viewing a resource (i.e., a short click) can be interpreted as a lack of relevance. In some implementations, the click data is a count of clicks of all types (e.g., long, medium, short) for a particular query and resource combination. In some implementations, the click data includes a count of each click type (e.g., long, medium, short) for a particular query and resource combination. Aggregated click data from queries for a given resource can be used to adjust the trustworthiness score T of the resource.

In some implementations, a long click of a video occurs if the video is viewed in excess of a playback duration that defines threshold view time, e.g., 30 seconds. In some implementations, if the video resource is a video of less than 30 seconds duration, then a long click occurs if the entire video is viewed at least once during a session. Alternatively, if the video resource is a video of less than 30 seconds duration, then a long click occurs if the entire video is viewed at least twice during a session. As used herein, the term "view" means that the video is played back on a user device without interruption, e.g., without navigating to another web page, or causing the browser window in which the video is being played back to become an inactive window. Other definitions can also be used.

Figure 6:
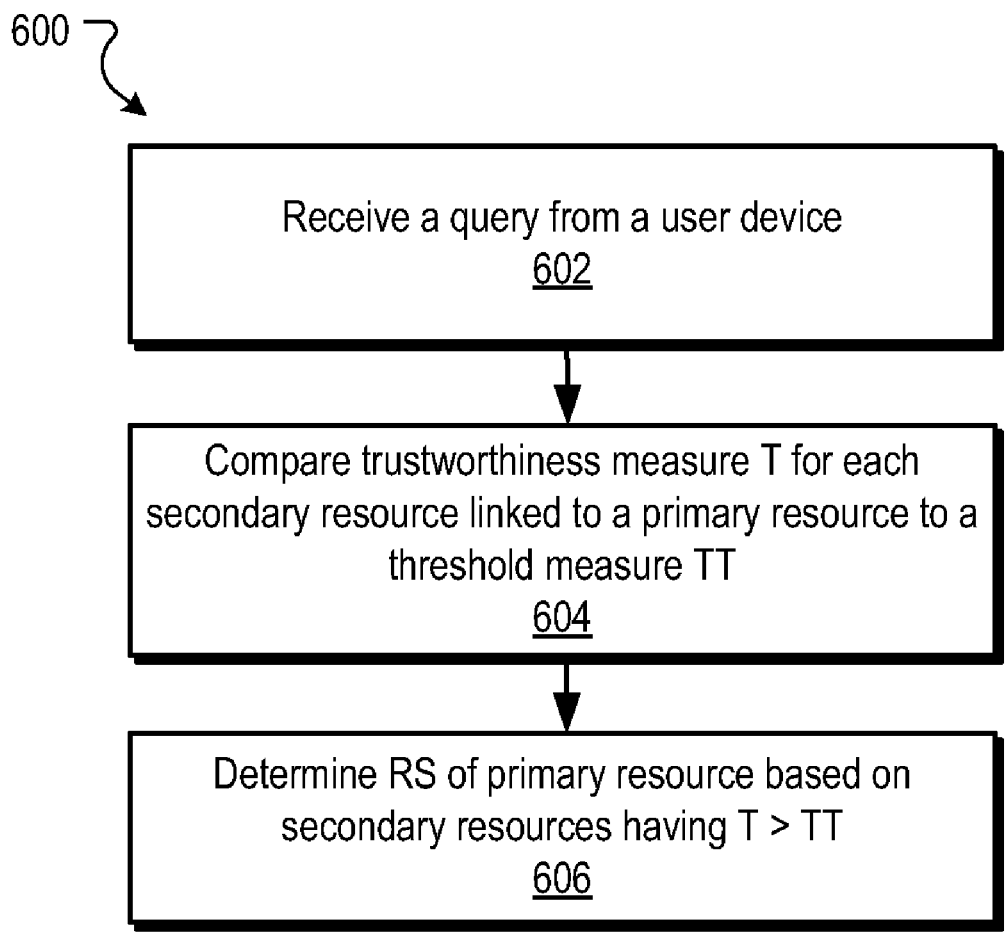
FIG. 6 is a flow diagram of an exemplar resource search operation.

FIG. 6 is a flow diagram of an exemplar process 600 of a resource search operation in accordance with these implementations. As illustrated in FIG. 6, a query is received from a user device (e.g., the user device 106; step 602), and a trustworthiness measure T for each secondary resource linked to a primary resource is compared to a threshold measure (e.g., at leaf nodes 118; step 604). Only the resources with a T measure exceeding a corresponding threshold measure are selected for use in determining the RS of the primary resource (606).

In some implementations, the threshold trustworthiness score TT is the same for each leaf node 118, and is selected by a system administrator, for example. In other implementations, the threshold trustworthiness score TT can be set independently for each leaf node. For example, the threshold trustworthiness score can be set for each leaf node 118 so that a fixed percentage or number of the resources is selected in each leaf node, e.g., 1%, 200, etc.

Although the examples above are described in the context of leaf nodes, the processes above can also be implemented in a search system that does not use multiple leaf node servers. For example, an RS can be used to rank resources in a single sever or apparatus.

Figure 7:
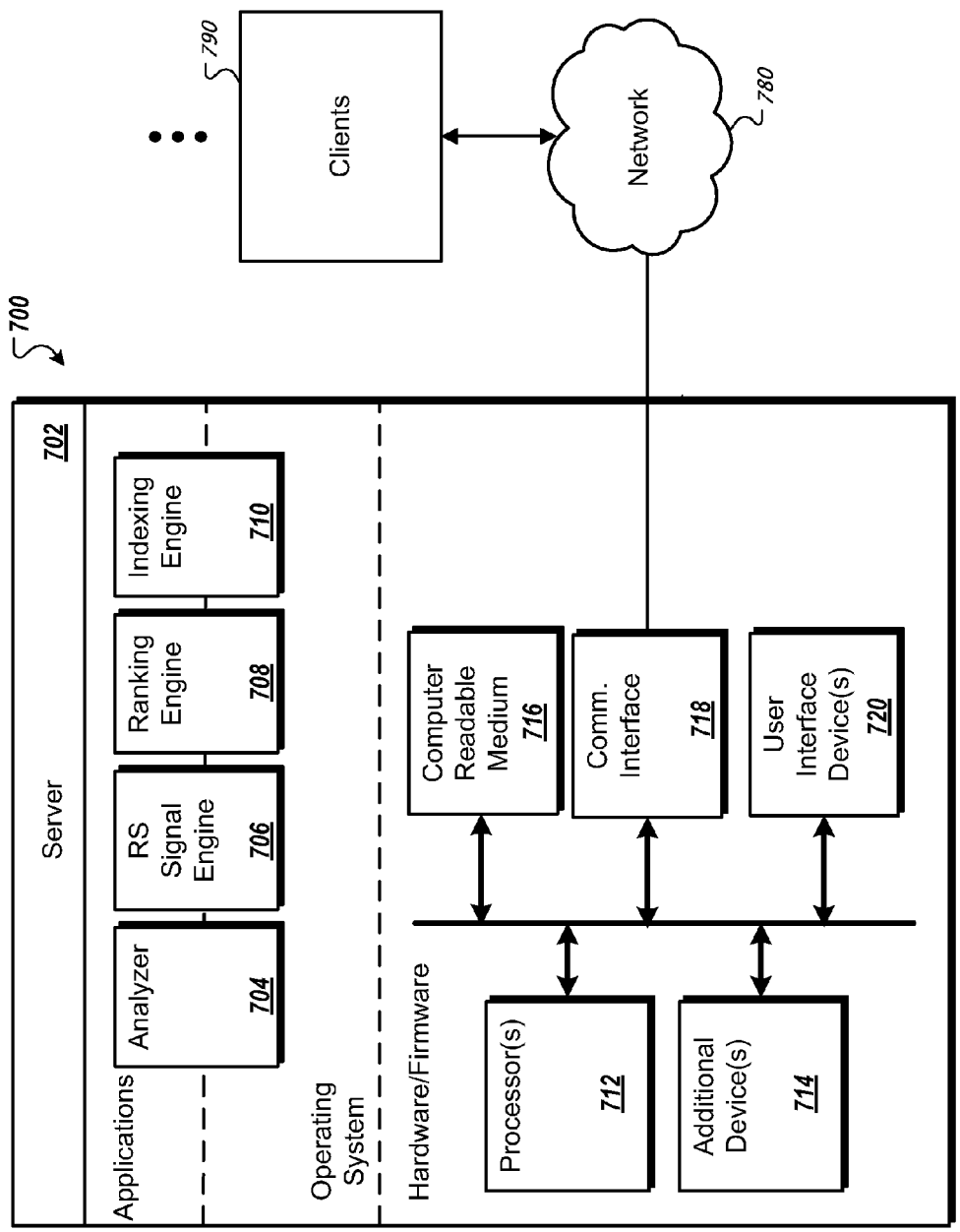
FIG. 7 is a schematic diagram of an example system configured to provide related images.

FIG. 7 is a schematic diagram of an example system configured to derive an RS signal. The system generally consists of a server 702. The server 702 is optionally connected to one or more user or client computers 790 through a network 780. The server 702 consists of one or more data processing apparatus. While only one data processing apparatus is shown in FIG. 7, multiple data processing apparatus can be used. The server 702 includes various modules, e.g. executable software programs, including an analyzer 704 for analyzing the historical data and resource index data in order to derive or update dynamic parameters and/or functions. An RS signal engine 706 is configured to calculate the RS signal of a resource on the fly using the parameters and functions derived by the analyzer 704. Alternatively, the RS signal can be calculated for resources ahead of time so that the RS signal engine 706 only needs to look up the value for a given resource. A ranking engine 708 ranks resources responsive to a query which were identified using one or more indexes maintained by the indexing engine 710. The ranking engine 708 can use the RS signal provided by the RS signal engine 706 as an additional input to is ranking algorithm.

Each module runs as part of the operating system on the server 702, runs as an application on the server 702, or runs as part of the operating system and part of an application on the server 702, for instance. Although several software modules are illustrated, there may be fewer or more software modules.

Moreover, the software modules can be distributed on one or more data processing apparatus connected by one or more networks or other suitable communication mediums.

The server 702 also includes hardware or firmware devices including one or more processors 712, one or more additional devices 714, a computer readable medium 716, a communication interface 718, and one or more user interface devices 720. Each processor 712 is capable of processing instructions for execution within the server 702. In some implementations, the processor 712 is a single or multi-threaded processor. Each processor 712 is capable of processing instructions stored on the computer readable medium 716 or on a storage device such as one of the additional devices 714. The server 702 uses its communication interface 718 to communicate with one or more computers 790, for example, over a network 780. Examples of user interface devices 720 include a display, a camera, a speaker, a microphone, a tactile feedback device, a keyboard, and a mouse. The server 702 can store instructions that implement operations associated with the modules described above, for example, on the computer readable medium 716 or one or more additional devices 714, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   identifying one or more secondary resources reachable through one or more links of a primary resource wherein the secondary resources are within a number of hops from the primary resource;
   determining an aggregate score for the primary resource based on respective scores of the secondary resources wherein each one of the respective scores is calculated based on prior user interactions with a respective secondary resource, wherein the prior user interactions with the respective secondary resource represent an aggregation of multiple users' interactions with the secondary resource; and
   providing the aggregate score as an input signal to a resource ranking process for the primary resource when the primary resource is provided as a search result responsive to a query.

2. The method of claim 1, wherein the prior user interactions with the respective secondary resource comprise a median access time or a click-through-rate associated with the respective secondary resource.

3. The method of claim 1, wherein the respective secondary resource comprises a document, an image, or multimedia content, and wherein the primary resource is a web page providing access to the document, image, or multimedia content.

4. The method of claim 1, wherein the one or more secondary resources reachable through one or more links of the primary resource comprise respective tertiary resources reachable through one or more links of a corresponding secondary resource.

5. The method of claim 4, wherein the respective scores of the secondary resources are calculated based on signals derived from prior user interactions with the respective tertiary resources.

6. The method of claim 1, wherein providing the aggregate score as an input signal comprises:
   determining an initial rank score for the primary resource;
   determining a promotion factor based on the aggregate score; and then
   modifying the aggregate score by combining the initial rank score with the promotion factor.

7. A computer program product tangibly embodied in a computer-readable storage device, the computer program product including instructions operable to cause one or more data processing apparatus to perform operations comprising:
   identifying one or more secondary resources reachable through one or more links of a primary resource wherein the secondary resources are within a number of hops from the primary resource;
   determining an aggregate score for the primary resource based on respective scores of the secondary resources wherein each one of the respective scores is calculated based on prior user interactions with a respective secondary resource, wherein the prior user interactions with the respective secondary resource represent an aggregation of multiple users' interactions with the secondary resource; and
   providing the aggregate score as an input signal to a resource ranking process for the primary resource when the primary resource is provided as a search result responsive to a query.

8. The program product of claim 7, wherein the prior user interactions with the respective secondary resource comprise a median access time or a click-through-rate associated with the respective secondary resource.

9. The program product of claim 7, wherein the respective secondary resource comprises a document, an image, or multimedia content, and wherein the primary resource is a web page providing access to the document, image, or multimedia content.

10. The program product of claim 7, wherein the one or more secondary resources reachable through one or more links of the primary resource comprise respective tertiary resources reachable through one or more links of a corresponding secondary resource.

11. The program product of claim 10, wherein the respective scores of the secondary resources are calculated based on signals derived from prior user interactions with the respective tertiary resources.

12. The program product of claim 7, wherein providing the aggregate score as an input signal comprises:
   determining an initial rank score for the primary resource;
   determining a promotion factor based on the aggregate score; and then
   modifying the aggregate score by combining the initial rank score with the promotion factor.

13. A system comprising:
   a computer-readable storage device including instructions; and
   one or more data processing apparatus operable to execute the instructions and perform operations comprising:
      identifying one or more secondary resources reachable through one or more links of a primary resource wherein the secondary resources are within a number of hops from the primary resource;
      determining an aggregate score for the primary resource based on respective scores of the secondary resources wherein each one of the respective scores is calculated based on prior user interactions with a respective secondary resource, wherein the prior user interactions with the respective secondary resource represent an aggregation of multiple users' interactions with the secondary resource; and
      providing the aggregate score as an input signal to a resource ranking process for the primary resource when the primary resource is provided as a search result responsive to a query.

14. The system of claim 13, wherein the prior user interactions with the respective secondary resource comprise a median access time or a click-through-rate associated with the respective secondary resource.

15. The system of claim 13, wherein the respective secondary resource comprises a document, an image, or multimedia content, and wherein the primary resource is a web page providing access to the document, image, or multimedia content.

16. The system of claim 13, wherein the one or more secondary resources reachable through one or more links of the primary resource comprise respective tertiary resources reachable through one or more links of a corresponding secondary resource.

17. The system of claim 16, wherein the respective scores of the secondary resources are calculated based on signals derived from prior user interactions with the respective tertiary resources.

18. The system of claim 13, wherein providing the aggregate score as an input signal comprises:
   determining an initial rank score for the primary resource;
   determining a promotion factor based on the aggregate score; and then
   modifying the aggregate score by combining the initial rank score with the promotion factor.

* * * * *

UNITED STATES PATENT AND TRADEMARK OFFICE
CERTIFICATE OF CORRECTION

PATENT NO. : 8,307,005 B1
APPLICATION NO. : 12/827676
DATED : November 6, 2012
INVENTOR(S) : Hao He, Yu He and David P. Stoutamire Page 1 of 1

It is certified that error appears in the above-identified patent and that said Letters Patent is hereby corrected as shown below:

On Title Page, Col. 2, line 1 (Primary Examiner), delete "Wood" and insert -- Woo --, therefor.

Signed and Sealed this
Nineteenth Day of February, 2013

Teresa Stanek Rea
*Acting Director of the United States Patent and Trademark Office*